United States Patent [19]
Silverberg

[11] Patent Number: 5,091,790
[45] Date of Patent: Feb. 25, 1992

[54] MULTIPURPOSE COMPUTER ACCESSORY FOR FACILITATING FACSIMILE COMMUNICATION

[76] Inventor: Morton Silverberg, 24 Edgewater Common, Westport, Conn. 06880

[21] Appl. No.: 459,057

[22] Filed: Dec. 29, 1989

[51] Int. Cl.⁵ .............................................. H04N 1/32
[52] U.S. Cl. .................... 358/434; 358/407; 358/440
[58] Field of Search ............... 358/400, 401, 402, 403, 358/405, 407, 438, 439, 440, 441, 442, 404, 444, 434

[56] References Cited

U.S. PATENT DOCUMENTS

| | | | |
|---|---|---|---|
| 3,816,652 | 6/1974 | Barnett | 178/7.6 |
| 3,818,126 | 6/1974 | Fomenko et al. | 178/6 |
| 3,869,569 | 3/1975 | Mason et al. | 178/7.6 |
| 4,383,755 | 5/1983 | Fedder et al. | 355/11 |
| 4,575,214 | 3/1986 | Curley | 355/3 R |
| 4,622,592 | 11/1986 | Ikehata et al. | 358/440 |
| 4,754,300 | 6/1988 | Fukae | 355/3 R |
| 4,794,419 | 12/1988 | Shibazaki et al. | 358/300 |
| 4,814,798 | 3/1989 | Fukae et al. | 346/160 |
| 4,847,891 | 7/1989 | Kotani | 358/440 |

FOREIGN PATENT DOCUMENTS

62-132464  6/1987  Japan .

Primary Examiner—Jin F. Ng
Assistant Examiner—Jerome Grant, II
Attorney, Agent, or Firm—Robert H. Whisker; Melvin J. Scolnick; David E. Pitchenik

[57] ABSTRACT

A computer accessory for interfacing a microcomputer with a fax line includes facility for converting fax signals to Ascii form for application to a PC port, and for converting signals of Ascii form received at the PC port to image for conversion to fax signals. The accessory, which preferably is incorporated in a laser printer or copier scanner, also includes a facility for notifying an intended recipient of the reception of a fax message.

21 Claims, 3 Drawing Sheets

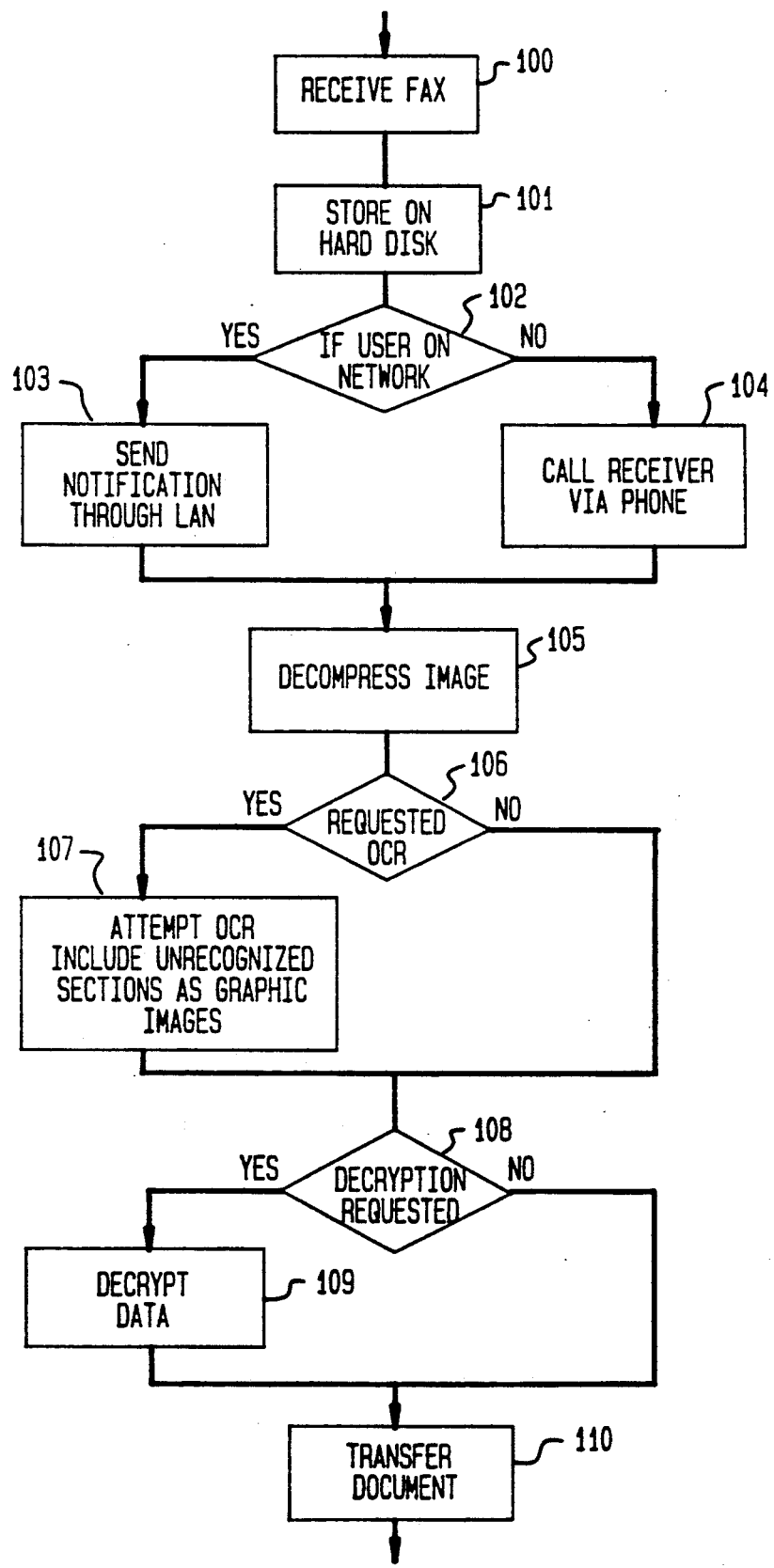

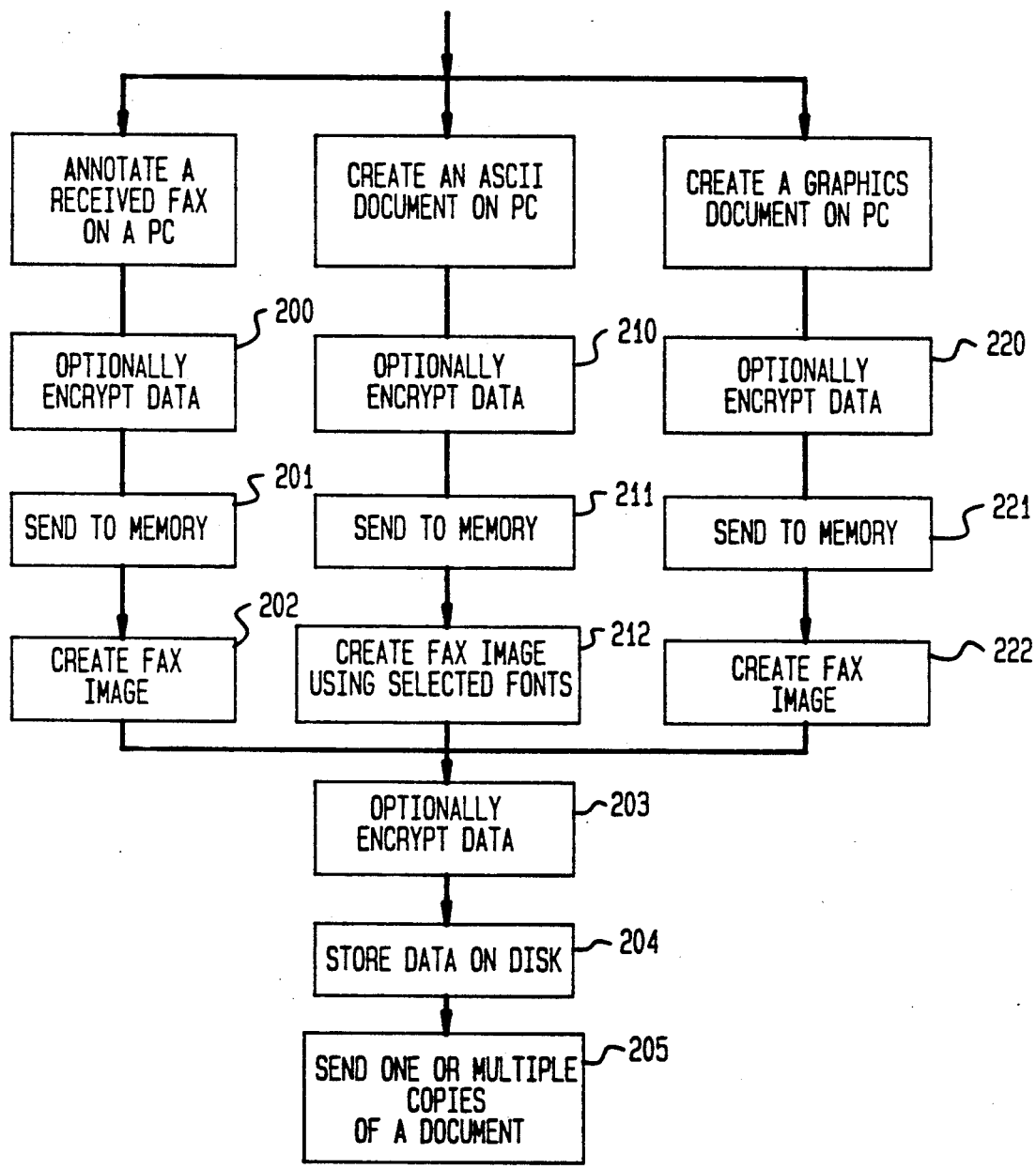

MULTIPURPOSE COMPUTER ACCESSORY FOR FACILITATING FACSIMILE COMMUNICATION

FIELD OF THE INVENTION

This invention relates to a computer accessory that is especially adapted to facilitate facsimile communication to and from a computer or LAN. The accessory may advantageously constitute a portion of another apparatus, such as a laser printer or the like, or it may be a stand-alone apparatus.

BACKGROUND OF THE INVENTION

A number of techniques have been suggested that employ microcomputers, such as PCs, in the reception and transmission of facsimile images. Prior equipment employing such techniques has generally not been entirely satisfactory due, for example, to the low resolution of conventional microcomputer screens as compared with facsimile images.

SUMMARY OF THE INVENTION

The present invention is therefore directed to the provision of an accessory that overcomes the disadvantages of prior equipment and that also provides additional capabilities that integrate facsimile capability into microcomputers and microcomputer systems.

Briefly stated, in accordance with one embodiment of the invention, a computer accessory comprise a fax port for receiving and transmitting fax messages, a second port adapted to be connected to at least one microcomputer, and controlling means for receiving fax messages from the fax port and applying corresponding messages to the second port and for receiving fax messages from the second port and applying corresponding messages to the fax port. The accessory further includes means responsive to the receipt of a fax message at the fax port for identifying an intended recipient of the fax message, and means for providing a notification signal indicating the receipt of the fax message. The intended recipient may be notified via the second port, or via a voice message generated by a voice messaging system. Printing of the fax message can either be in parallel with notification or delayed until authorized by the recipient.

In accordance with a further embodiment of the invention, the computer accessory comprises a fax port for receiving and transmitting fax messages, a second port adapted to be connected to at least one microcomputer, and controlling means for receiving fax messages from the fax port and applying corresponding messages to the second port and for receiving fax messages from the second port and applying corresponding messages to the fax port. In this embodiment of the invention, the controlling means comprises character recognition means for converting images of characters corresponding to received fax signals to coded form, and means applying the signals of coded form to the second port. The coded form of the signals may be Ascii form.

In accordance with a still further embodiment of the invention, the computer accessory comprises a fax port for receiving and transmitting fax messages, a second port adapted to be connected to at least one microcomputer, and controlling means for receiving fax messages from the fax port and applying corresponding messages to the second port and for receiving fax messages from the second port and applying corresponding messages to the fax port. The controlling means in this arrangement comprises means responsive to the receipt of Ascii coded signals at the second port for converting the Ascii coded signals to image signals for fax transmission to a desired fax station. The fax transmission can be made immediately, it can be delayed until the fax recipient's receiver is available or it can be made at a predesignated time of transmission.

In accordance with another embodiment of the invention, the computer accessory comprises a fax port for receiving and transmitting fax messages, a second port adapted to be connected to at least one microcomputer, and controlling means for receiving fax messages from the fax port and applying corresponding messages to the second port and for receiving fax message from the second port and applying corresponding messages to the fax port. In this arrangement the controlling means comprises means for decrypting received fax signals for application to the second port, and means for encrypting signals at the second port for application to the fax port.

The memory of the accessory can store both fax and PC messages when the printer is busy The accessory in accordance with the invention is advantageously combined with a laser printer adapted to print both PC and fax messages, in order to provide the preceding functional capabilities with minimum of incremental cost. Alternatively, the accessory may be a stand alone device. In this latter case a port is also required for interfacing a printer.

BRIEF DESCRIPTION OF THE DRAWING

In order that the invention may be more clearly understood, it will now be disclosed in greater detail with reference to the accompanying drawing, wherein:

FIG. 2 is a flow diagram illustrating the use of the accessory of the invention in the reception of fax messages; and FIG. 3 is a flow diagram illustrating use of the accessory of the invention in the transmission of fax messages.

DETAILED DISCLOSURE OF THE INVENTION

Figure 1:
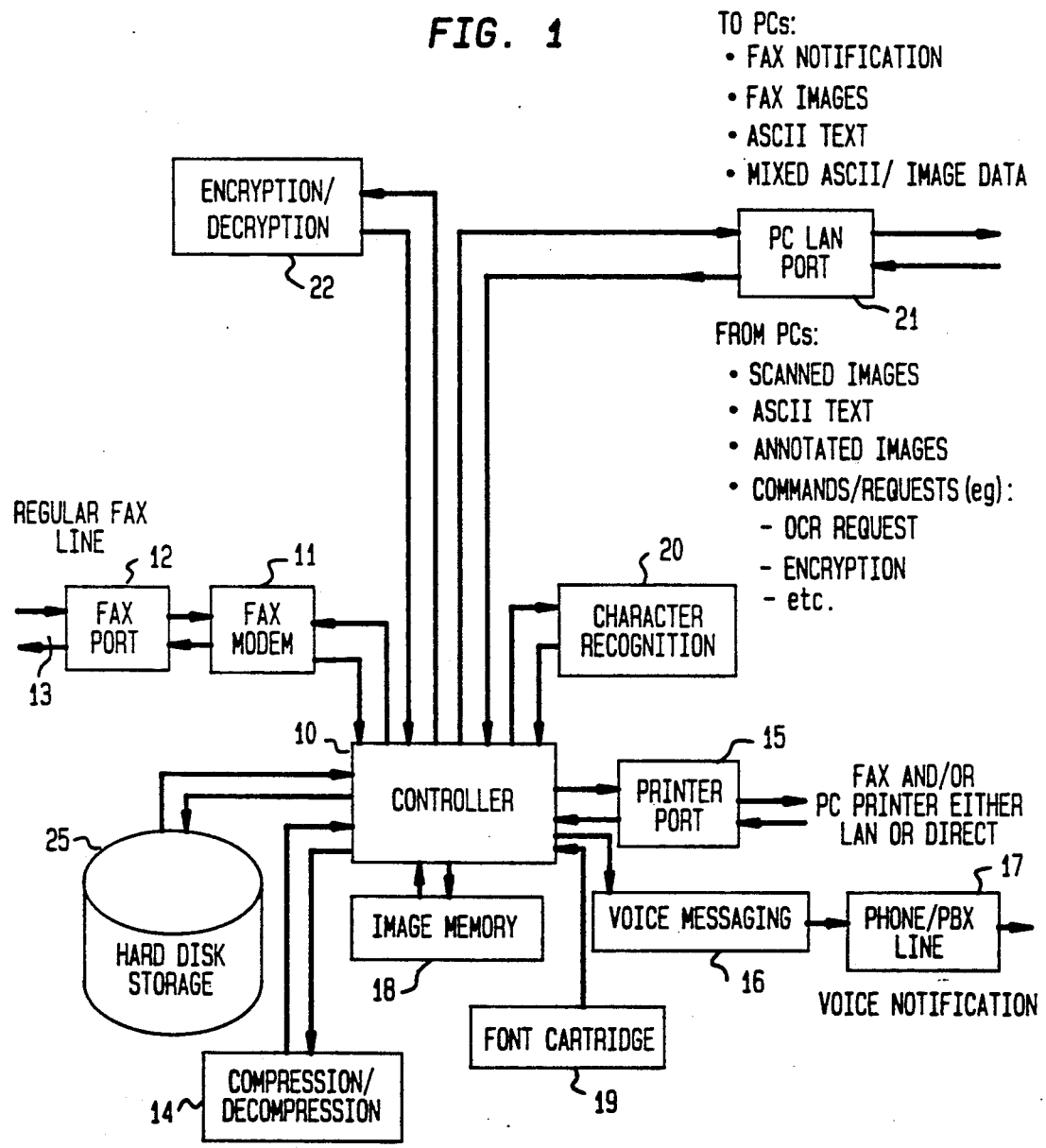
FIG. 1 is a block diagram of a computer accessory in accordance with a preferred embodiment of the invention.

Referring now to FIG. 1, therein is illustrated a computer accessory comprising a controller 10. This controller may, for example, be a conventional microprocessor system including ROM memory, etc. The following elements are coupled to the controller 10:

1. A conventional fax modem 11 is coupled between the controller 10 and a fax port 12 for two-way communication with a fax line 13, such as a conventional telephone line.

2. A compression/decompression system 14 for effecting the compression and/or decompression of facsimile signals. This element employs conventional techniques.

3. A port 15 adapted to be coupled to a printer, such as a laser printer, for printing of fax images or text and/of graphics from an external microcomputer.

4. A voice messaging system 16 responsive to the control of the controller 10 for developing voice message for application to a phone or PBX line 17, in order to enable alerting of the intended recipient of a fax message. This element may employ known devices to simulate the voice.

5. An image memory 18 for storing images corresponding to fax messages or information received from the external microprocessor.

6. A font cartridge 19 for developing characters for printing, for example in response to ASCII signals received from the external microcomputer. This cartridge may be of the type conventionally employed in laser printers.

7. A character recognition system 20, such as OCR software to operate the control system, adapted to produce ASCII or other character signals corresponding to characters present in a facsimile image.

8. A port 21 adapted to be connected to an external microcomputer (PC) or LAN.

9. A large data storage area 23, such as a hard disk.

10. An encryptor/decryptor system 22.

The above elements have been illustrated to constitute elements separate from the controller 10 in order to simplify the description of the invention. It will of course be evident that the functions of many of these elements are more advantageously effected internally of the controller.

In a particularly advantageous embodiment of the invention, the system is incorporated within or affixed to a laser printer, such as, for example, the apparatus disclosed in copending U.S. patent application Ser. No. 459,057 whereby the controller 10, font cartridge 19 and PC port 21 may constitute the controller, font cartridge and PC port of the printer. In this event, of course, the printer port 15 is not necessary. The power supply of the printer may be employed for any additional elements required for the accessory. This combination, time sharing the normal functions of the laser printer and the accessory, is especially desirable since laser printers are normally never used to their full advantage.

Alternatively, the accessory may be incorporated in a copier/scanner such as disclosed, for example, in copending U.S. patent application Ser. No. 459,058, or be assembled as a stand-alone device.

In operations, assume initially that a fax message is received on the line 13, as illustrated at block 100 in FIG. 2. The message is either printed immediately or stored in memory, and/or stored on the hard disk 23 at this time (Block 101), as previously selected by the recipient. The system then attempts to establish contact with the intended recipient. If the recipient is on an electronic Mailnet network (Block 102), the system may send a message via LAN port 21. The accessory may send a message (Block 103) to appear on the screen of the recipient that a fax message has been received. If the recipient is not available via an Electronic Mail network, the accessory may energize a voice messaging system 16 (Block 104) to initiate a call to the recipient via the telephone line 17. If the recipient cannot be reached via the telephone line, then the accessory may repeat the attempt as desired.

If the accessory of the invention is to be employed in a multiuser system, it may be necessary to provide means for identifying the intended recipient of the fax message. This may be effected by any of several different techniques. For example, the header of the received fax message may include such information. Alternatively, the fax message may be prepared with the identity of the desired recipient at a given location (e.g. in a box in the upper right hand corner). Such techniques of course require the sender to properly prepare the document prior to faxing it. In a further technique, especially useful if the message will be converted to Ascii form by the accessory, the program of the controller 21 may analyze the text of the heading of the resultant document to identify the intended user. In a still further alternative, the document being faxed may be provided with a bar code that identifies the recipient, the accessory thereby scanning the image of the message in the image memory 18 to locate and interpret this information.

If the message was stored and not printed, in accordance with a previous selection by the recipient for "confidential" messages, the intended recipient may acknowledge receipt of the message that a fax message has been received by directing an appropriate acknowledgement to the accessory via the port 21. Upon the receipt of such authorization, the accessory proceeds to recover the message from the hard disk, decompress and print it (Block 105). Authorization to print can also be accomplished by the recipient goint to the fax printer and entering an authorization code therein.

Due to the differences in resolutions of the characters in a fax image and conventional microcomputer screens, it is generally not convenient to review fax messages directly on the microcomputer screen. In accordance with the invention, this disadvantage may be overcome by converting the character content of the fax message to Ascii form. This option may be indicated to the accessory in any desired manner. For example, a header may be provided on the fax message indicating that the message is to be converted to Ascii form. Alternatively, the recipient may signal that this option should be used, either in the acknowledgment message, or by permanent instructions stored in the accessory. Accordingly, the accessory now tests (Block 106) to determine if the fax message is to be converted. If so, the controller proceed to convert the image, using the character recognition element 20. Any conventional OCR recognition technique may be employed for this purpose.

If the fax message has a graphic portion thereon, i.e. that is not adaptable to conversion to Ascii form, the program of the controller 21 may ignore this portion of the message in the conversion of signals to Ascii form, and transmit it directly to the PC port as a graphic image, enlarged if desired, for analysis and direction by the recipient.

In the past it has been conventional to communicate via fax messages without encryption, even though the messages may contain, for example, crucial or critical business information. In accordance with the invention, risk of security leaks of such information may be minimized in a simple and economical manner by the provision of the encryption/decryption element 22. The encryption/decryption may be of any conventional form, and it may be encryption/decryption of either the compressed or uncompressed digital fax signals. If the accessory is provided with the encryption-/decryption element 22, it may now determine if decryption is desired (Block 108). In order to indicate a request for such decryption, the header of the fax message may include signals indicating such a request. Otherwise, the recipient may indicate the request in the message therefrom acknowledging the notification of the reception of the message by the accessory (and hence requesting the accessory to forward the message), or the accessory may have instructions stored therein requiring decryption of all messages sent to this recipient. If the request for decryption is found, the message is decrypted (Block 109) and sent via the port 21 to the recipient.

Otherwise it is sent to the recipient without decryption (Block 110).

In addition to applying the fax message in convenient form for display on the screen of the external microcomputer, the fax may also be printed out via the printer port 15. Such printing could constitute the direct printing of the fax image, in the manner disclosed for example in copending application Ser. No. 458,870 filed concurrently herewith, or the accessory may employ the characters recognized during character recognition, and the font cartridge 19, for producing signals that can be handled directly by a laser printer.

In order to transmit fax messages from microcomputers connected to the port 21 instructions may be given to the controller to encrypt the messages. This may be effected as a permanent instruction to the controller 10, or it may constitute a part of a header of the message applied to the port 21.

The controller upon receipt of a fax message from the port 21, if it is in Ascii form, may convert the message into a more convenient form for fax messages, using the conversion data stored in the font cartridge 19. The controller then effects the compression and modulation of the message, and its transmission to the fax line 13 via the modem 11 and port 12.

The accessory in accordance with the invention also enables annotation and retransmission of fax messages. For example, when the accessory receives a fax message and converts the character information thereon to Ascii form, the message is received by a microcomputer connected to the port 21 in a format that can processed, for example, by a word processor employed by the microcomputer. Accordingly, the user at the microprocessor may modify the information and resend it in modified from to the accessory for refaxing to the sender. If, on the other hand, the message includes graphic portions that are displayed on the screen of the microcomputer, the user may make changes, comments, etc., on this graphic portions with a conventional graphics program, for retransmission in annotated form to the accessory and hence to the sender of the original fax. Alternatively, a received fax message can be stored in memory as well as printed. The recipient can now use his computer to enter annotations for inclusion on the margins or to overlay portions of the received message. The combined message can now be transmitted as a new fax message without resulting in the image losses that normally accompany the scanning of a fax copy, and with greater use convenience.

When an Ascii file is sent to the accessory via the port 21, the image memory 18 may be employed to build up an image of the data, based upon the font information in the font cartridge. In this event, the fax signals for transmission are derived from the image memory. The image memory is also employed as a memory for storing an image corresponding to received fax signals, for use in conversion to Ascii form by the character recognition element 20.

FIG. 3 is a flow diagram illustrating some techniques for employing the accessory of the invention in the development and transmission of fax messages. In this flow diagram, messages are received at the PC port are handled in several different manners, depending upon the function to be served. Thus, in the left hand column of this figure, if the PC message requires retransmission of an annotated message, the message may be optionally encrypted (Block 200). The data is now stored in the image memory (Block 201), and the data in this memory is converted to a fax image format in the manner discussed above. If the input data had not been encrypted, it may optionally be encrypted now (Block 203 before storage on the hard disk and transmission (Block 205).

If, on the other hand, signals corresponding to an Ascii document are presented to the port 21 by the external microcomputer, as illustrated in the central column of blocks in FIG. 3, this data may be optionally encrypted (Block 210) and stored in the image memory (Block 211). The data in the image memory is now converted to fax format, using the font cartridge to convert the Ascii signals to graphic data (Block 212). This information may be optionally encrypted (Block 203), and stored and transmitted.

If the data to be transmitted is in graphic form, as illustrated in the right hand column in FIG. 3, the data may be optionally encrypted (Block 220) and stored in the image memory. The fax image may be created directly from this data (Block 222).

The invention thereby provides an integrated high capacity memory system adapted to service both fax storage and processing needs, as well as providing a bridge between fax and PC systems.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. A computer accessory comprising a fax port for receiving fax messages, a second port adapted to be connected to at least one microcomputer for communication of messages to and from said microcomputer, controlling means for receiving fax messages from said fax port and applying corresponding messages to said second port and for receiving fax messages from said second port and applying corresponding messages to said fax port, means responsive to the receipt of a fax message at said fax port for identifying an intended recipient of said fax message, and means for providing a notification signal indicating the receipt of said fax message.

2. The computer accessory of claim 1 wherein said means providing a signal comprises means responsive to the active interconnection of said intended recipient with said second port for applying said notification signal to said second port.

3. The computer accessory of claim 1 wherein said means providing a signal comprises a voice messaging system coupled to said controlling means, and means for applying said notification signal to said voice messaging system.

4. The computer accessory of claim 1 wherein said controlling means further comprises font memory means responsive to the receipt of Ascii coded signals at said second port for converting said Ascii coded signals to image signals for fax transmission.

5. The computer accessory of claim 4 wherein said controlling means further comprises means for decrypting received fax signals for application to said second port, and means for encrypting signals at said second port for application to said fax port.

6. The computer accessory of claim 4 wherein said controlling means further comprises character recognition means for converting images of characters corresponding to received fax signals to coded form, and means applying said signals of coded form to said second port.

7. A computer accessory as described in claim 1 wherein said identifying means further comprises means for recovering information identifying said intended recipient from a header associated with said fax message.

8. A computer accessory as described in claim 1 wherein said identifying means further comprises means for recovering information identifying said intended recipient from graphics information comprised in a predetermined portion of said fax message.

9. A computer accessory comprising a fax port for receiving fax messages, a second port adapted to be connected to at least one microcomputer for communication of messages to and from said microcomputer, and controlling means for receiving fax messages from said fax port and applying corresponding messages to said second port and for receiving fax messages from said second port and applying corresponding messages to said fax port, said controlling means comprising character recognition means for converting images of characters corresponding to received fax signals to coded form, and means applying said signals of coded form to said second port.

10. The computer accessory of claim 9 wherein said character recognition means comprises means for converting received fax signals to Ascii form.

11. A computer accessory comprising a fax port for receiving and transmitting fax messages, a second port adapted to be connected to at least one microcomputer for communication of messages to and from said microprocessor, and controlling means for receiving fax messages from said fax port and applying corresponding messages to said second port and for receiving fax messages from said second port and applying corresponding messages to said fax port, said controlling means comprising font memory means responsive to the receipt of Ascii coded signals at said second port for converting said Ascii coded signals to image signals for fax transmission.

12. A computer accessory comprising a fax port for receiving and transmitting fax messages, a second port adapted to be connected to at least one microcomputer, or communication of messages to and from said microcomputer, and controlling means for receiving fax messages from said fax port and applying corresponding messages to said second port and for receiving fax messages from said second port and applying corresponding messages to said fax port, said controlling means comprising means for decrypting received fax signals for application to said second port, and means for encrypting signals at said second port for application to said fax port.

13. A computer accessory comprising a fax port for receiving and transmitting fax messages, wherein said fax messages correspond in part to text and in part to graphic images, a second port adapted to be connected to at least one microcomputer for communication of messages to and from said microcomputer, and controlling means for receiving fax messages from said fax port and applying corresponding corresponding messages to said second port and for receiving fax messages from said second port and applying corresponding messages to said fax port, said controlling means comprising means for converting signals corresponding to text to Ascii form for application to said second port and for converting signals corresponding to graphics to graphic form for application to said second port adapted to be connected to at least one microcomputer, for communication of messages to and from said microcomputer, controlling means for receiving fax messages from said fax port and applying corresponding messages to said fax port and applying corresponding messages to said second port and for receiving fax messages from said second port and applying corresponding messages to said fax port, said ontrolling means further comprising a printer output, a memory, means for storing data from said second port for application to said printer output, and means for storing fax messages from said fax port in said memory.

14. A computer accessory comprising a fax port for receiving fax messages, a second port adapted to be connected to at least one microcomputer, controlling means for receiving fax messages from said fax port and applying corresponding messages to said second port and for receiving fax messages from said second port and applying corresponding messages to said fax port, said controlling means further comprising a printer output, a memory, means for storing data from said second port for application to said printer output, and means for storing fax messages from said fax port in said memory.

15. The computer accessory of claim 14 further comprising means responsive to the receipt of a fax message at said fax port for identifying an intended recipient of said fax message, and means for providing a notification signal indicating the receipt of said fax message.

16. The computer accessory of claim 15 wherein said controlling means further comprises font memory means responsive to the receipt of Ascii coded signals at said second port for converting said Ascii coded signals to image signals for fax transmission.

17. A computer accessory comprising a fax port for receiving fax messages, a second port adapted to be connected to at least one microcomputer for communication of messages to and from said microcomputer, controlling means for receiving fax messages from said fax port and applying corresponding messages to said second port and for receiving fax messages from said second port and applying corresponding messages to said fax port, said controller means comprising memory means for storing a fax message received at said fax port, means converting a fax message stored in said memory means to signals for application to said second port whereby the display of a microcomputer connected to said second port may display said fax message, means for receiving a modified signal from said second port, and means for converting said modified signal to a fax signal for application to said fax port.

18. The computer accessory of claim 17 further comprising means responsive to the receipt of a fax message at said fax port for identifying an intended recipient of said fax message, and means for providing a notification signal indicating the receipt of said fax message.

19. The computer accessory of claim 18 wherein said controlling means further comprises a printer output, a memory, means for storing data from said second port for application to said printer output, and means for storing fax messages from said fax port in said memory.

20. The computer accessory of claim 19 wherein said controlling means further comprises font memory means responsive to the receipt of Ascii coded signals at said second port for converting said Ascii coded signals to image signals for fax transmission.

21. The computer accessory of claim 19 wherein said controlling means comprises font memory means responsive to the receipt of Ascii coded signals at said second port for converting said Ascii coded signals to image signals for fax transmission, and said controlling means still further comprises a printer output, means for storing data from said second port in said memory means for application to said printer output, and means for storing fax messages from said fax port in said memory means.

* * * * *

(12) EX PARTE REEXAMINATION CERTIFICATE (7286th)

United States Patent
Silverberg

(10) Number: US 5,091,790 C1
(45) Certificate Issued: Jan. 5, 2010

(54) MULTIPURPOSE COMPUTER ACCESSORY FOR FACILITATING FACSIMILE COMMUNICATION

(76) Inventor: Morton Silverberg, 24 Edgewater Common, Westport, CT (US) 06880

Reexamination Request:
No. 90/009,442, Mar. 31, 2009

Reexamination Certificate for:
Patent No.: 5,091,790
Issued: Feb. 25, 1992
Appl. No.: 07/459,057
Filed: Dec. 29, 1989

(51) Int. Cl.
*H04N 1/32* (2006.01)
*H04N 1/00* (2006.01)
*H04N 1/44* (2006.01)

(52) U.S. Cl. .................. 358/434; 358/407; 358/440
(58) Field of Classification Search .................. None
See application file for complete search history.

(56) References Cited

U.S. PATENT DOCUMENTS

| 4,652,933 A | 3/1987 | Koshiishi ................. 358/256 |
| 4,964,154 A | 10/1990 | Shimotono ................. 379/100 |
| 4,996,707 A | 2/1991 | O'Malley et al. ........... 379/100 |

FOREIGN PATENT DOCUMENTS

| JP | 61-13863 | 1/1986 |
| JP | 64-12657 | 1/1989 |

OTHER PUBLICATIONS

O. Murakami, "Facsimile: New Communication Medium," Telecommunication Technology News, K.K. (Mar. 1981).
Ricoh ImageCard Manual (1989).

*Primary Examiner*—P. Tibbits

(57) ABSTRACT

A computer accessory for interfacing a microcomputer with a fax line includes facility for converting fax signals to Ascii form for application to a PC port, and for converting signals of Ascii form received at the PC port to image for conversion to fax signals. The accessory, which preferably is incorporated in a laser printer or copier scanner, also includes a facility for notifying an intended recipient of the reception of a fax message.

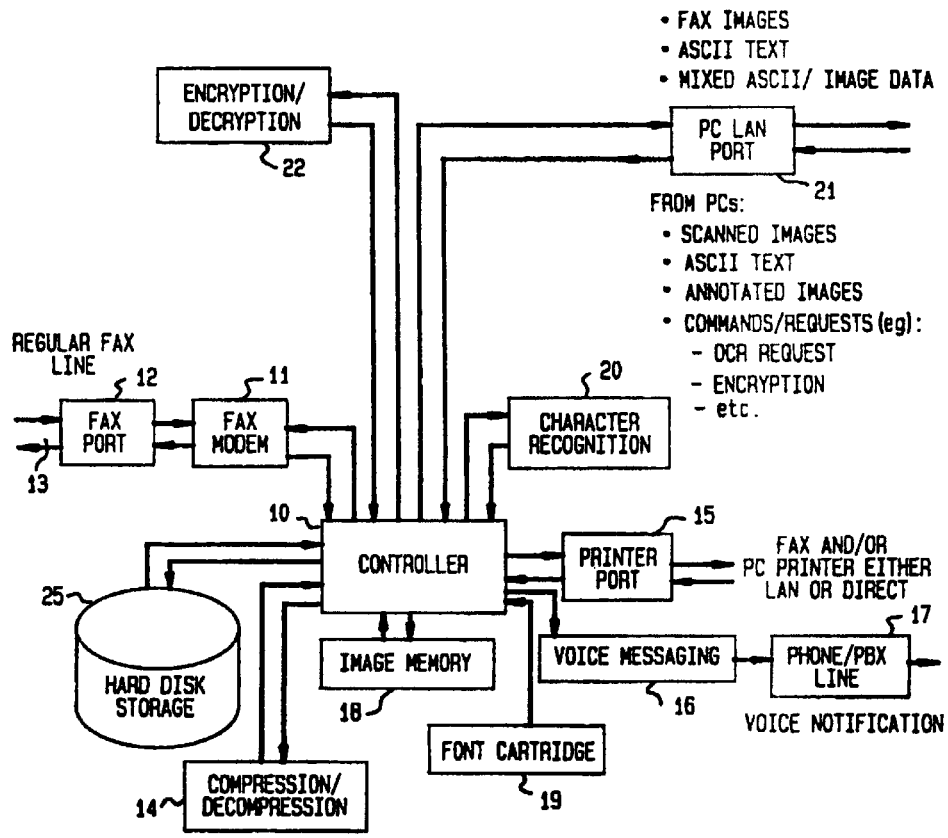

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 2, 4, 7 and 14–16 are cancelled.
Claims 3, 5, 6, 8–13 and 17–21 were not reexamined.

* * * * *